United States Patent [19]
Cerles et al.

[11] 3,974,572
[45] Aug. 17, 1976

[54] PROCESS AND HEAT EXCHANGER FOR CONTINUOUS CIRCULATION OF FLUIDIZED POWDER IN HEAT EXCHANGE WITH A HOT GAS

[75] Inventors: Georges Cerles; Robert Bitsch, both of Gardanne, France

[73] Assignee: Aluminium Pechiney, Lyon, France

[22] Filed: Jan. 16, 1975

[21] Appl. No.: 541,567

[52] U.S. Cl. ............................... 34/10; 432/15; 432/58; 432/107
[51] Int. Cl.² ....................... F26B 3/08; F27B 15/00
[58] Field of Search ............... 432/14, 15, 58, 107, 432/223; 34/10

[56] References Cited
UNITED STATES PATENTS

| | | |
|---|---|---|
| 2,761,668 | 9/1956 | Sylvest .............................. 432/58 X |
| 3,578,798 | 5/1969 | Lapple et al. ........................ 432/58 |

*Primary Examiner*—John J. Camby
*Attorney, Agent, or Firm*—McDougall, Hersh & Scott

[57] ABSTRACT

The invention relates to a process for continuously circulating a fluidized powder in a heat exchanger between a heat-carrying gas and a fluidized powder, and to heat exchangers using this process. In the process according to the invention, the circuit through which the fluidized material circulates is in the form of two series of tubes, namely one series of ascending tubes and another series of descending tubes, and the material is fluidized in these tubes with a density that is higher in the descending tubes than in the ascending tubes. The invention applies to any heat exchanger between a gas and a powder and, more particularly, to installations, for calcining hydrated alumina.

18 Claims, 4 Drawing Figures

PROCESS AND HEAT EXCHANGER FOR CONTINUOUS CIRCULATION OF FLUIDIZED POWDER IN HEAT EXCHANGE WITH A HOT GAS

This invention, which is the outcome of research by Messrs. Cerles and Robert Bitsch, relates to a process for the continuous circulation of a fluidized powder in a heat exchanger between a heat-carrying gas and a fluidized powder, and to a heat exchanger for carrying out this process.

The invention is concerned with the field of heat exchangers which function without direct contact.

In numerous chemical processes, materials in powder form are subjected to a so-called calcination treatment by direct contact with fumes. The term calcination is somewhat imprecise because, in many cases, pyrolysis takes place, in other words chemical change by temperature. For example, pyrolysis takes place in the manufacture of cement by a process involving the decarbonation of limestone, and in the production of alumina, in which a hydrate of alumina is dehydrated.

In most cases, the products of pyrolysis are gaseous: carbon dioxide in the first case, superheated steam in the second case. The evolution of these gases in the powders is sometimes extremely vigorous, resulting in fluidization of the powders. This phenomenon is known as autofluidization.

Calcination is generally carried out in a rotary kiln in the form of a tube rotating about its axis which is slightly inclined relative to the horizontal. The powders to be calcined move downwards in the lower part of the tube, whilst the hot gases flow upwards in the upper part of the tube in contact with the powder (countercurrent circulation).

In a kiln of this kind, autofluidization provides for a certain degree of agitation in the powder and, hence, improves heat exchange between the powder and the hot gases. Unfortunately, heat exchange is hampered by other effects of autofluidization, namely on the one hand slides or avalanches attributable to a reduction in the natural slope, and on the other hand massive carry-over due to the tumultuous projection of powder into the stream of high-speed gas, this carry-over being further aggravated by pokers provided to promote intimate contact between powder and gas. Finally, the heat balance of autofluidization is negative.

In the case of kilns for the calcination of alumina, carry-over, or the output from the furnace of a quantity of powder mixed with the gases, is greater than the output of the kiln itself, often reaching 1.5 times the output of the kiln. The first consequence is the necessity to provide very large dust extractors, the second being that heat exchange is far from perfect. For example, in a rotary kiln with an output of 40 tons of calcined alumina per hour, carry-over represents 60 tons per hour of a partially dehydrated hydrate, because it emanates mostly from the low-temperature zone. This kiln, fed by a cake of alumina hydrate, containing 13% of water of impregnation, consumes 120 kg of fuel per ton of alumina produced with an 11.6% excess of air.

The total fumes issuing from the kiln each hour have a calorific content equivalent to 35 tons per hour of water, whilst carry-out has a calorific content per hour which exceeds 30 tons of water. Since the calorific contents of the carry-over and fumes are similar to one another, the reduction in temperature of the fumes, substantially equal to the increase in temperature of the migrations, cannot in this mixing-type heat exchanger be any greater than half the temperature difference between the two streams of powder and gases at the input end of the kiln. This limit is further reduced by the need for an interval in the transfer chain and by a certain degree of dilution by parasitic air at the output end of the kiln.

It is known that some of these disadvantages can be obviated by completing the rotary kiln with an exchanger obtained by mounting in series several units which, although of the parallel-current type, are arranged in such a way that the general circulation in the exchanger as a whole takes place in countercurrent. The powder is transported in fluidized form. Accordingly, a certain number of vertically staggered cyclones is arranged in series.

This arrrangement provides for greater efficiency, as reflected in a saving of fuel amounting to 20 kg per ton of alumina. In addition, since it carries out some of the exchange, it enables the tube of the kiln to be shortened to a considerable extent.

On the other hand, it does have certain disadvantages. Investment is high, the installation of three cyclone stages necessitating the construction of a 40-meter tall toner which, at its upper end, supports a feed system. An existing installation would be extremely difficult to modify by the addition of an exchanger of this kind. The system is designed for a predetermined throughput and lacks flexibility in operation. The loss of pressure in the cyclones gives rise to a considerable consumption of energy. The alumina hydrate is difficult to introduce, in addition to which the pneumatic transport system involves a fairly high degree of abrasion.

The present invention relates to a process which, in a heat exchanger between a heat-carrying gas and a fluidized powder comprising a compartment in which the heat-carrying gas is circulated in a horizontal direction and, on the one hand, a first series of substantially vertical tubes in which the powder is fluidized and circulated downwards and, on the other hand, a second series of substantially vertical tubes arranged in the compartment in which the powder is fluidized and circulated upwards, provides for the continuous circulation of the powder in the two series of vertical tubes, thus enabling the disadvantages referred to above to be obviated.

In the process according to the invention, the powder is fluidized in the substantially vertical tubes with a higher density in the tubes of the first series than in those of the second series, so as to produce differential fluidization.

The invention also relates to apparatus for carrying out this process.

The invention thus defined is explained with reference to embodiments illustrated by way of example in the accompanying drawings, wherein:

FIG. 1 diagrammatically illustrates an installation for the calcination of hydrated alumina;

In the figures, identical components have been provided with the same reference numerals.

Figure 1:
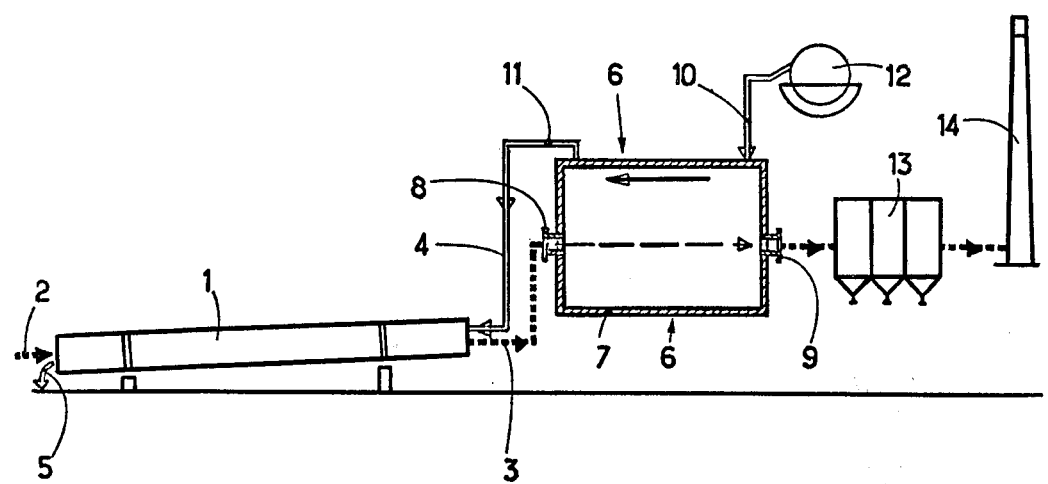

The calcining installation shown in FIG. 1 is an installation designed for the production of dry anhydrous alumina. An installation designed for a different purpose, for example the manufacture of cement, would be similar.

The installation comprises a rotary calcination kiln 1 provided with a fresh-air inlet 2, and outlet for fumes or hot gases 3, an inlet for hydrated alumina 4 and an outlet for anhydrous alumina 5. This kiln is well known and need not be described in more detail here. One example of such a kiln is described in French Pat. No. 1,394,755.

The alumina feeding the rotary kiln 1 is collected at the output end of a heat exchanger 6 which comprises, on the one hand, a compartment 7 provided in one of its opposite lateral walls with an inlet 8 for the heat-carrying gas, and in its opposite lateral wall with an outlet 9 for the heat-carrying gas, and on the other hand substantially vertical tubes connected at their inlet ends 10 to a source of wet hydrated alumina and, at the outlets 11 for dry hydrated alumina, to the input end 4 of the kiln 1.

The alumina inlet 10 of the heat exchanger 6 is fed by a feeder 12 whilst the outlet 9 for the heat-carrying gas is connected to a purifier, for example in the form of an electrofilter 13, which itself is connected to a chimney 14 through which the purified fumes aare discharged into the atmosphere.

Thus, fresh air enters the rotary kiln 1 at 2, forming the oxidant of a gas or fuel burner which produces a mixture of hot heat-carrying gases which cool by heating the alumina circulating in the opposite direction. This partly cooled heat-carrying gas leaves the kiln at 3 and, at 8, enters the exchanger 6 where it continues to cool. It leaves the exchanger at 9, is purified in the electrofilter 13 and discharged into the atmosphere through the chimney 14.

The wet hydrated alumina is introduced by the feeder 12, preheated, dried and partly dehydrated, into the exchanger 6 which it enters at 10 and which it leaves at 11. Through 4, it then enters the rotary kiln 1 where it is totally dehydrated, and is collected at 5 at the output end of the kiln.

The heat exchanger 6 according to the invention will now be described in detail.

Between the inlet 10 and the outlet 11, the alumina circulates through several stages corresponding to increasing dehydration temperatures and levels of the alumina and to decreasing temperatures of the heat-carrying gas. Each of these stages comprises two series of substantially vertical tubes, a first series in which the alumina circulates upwards and a second series in which the alumina circulates downwards. Each series comprises at least one tube, and the alumina is fluidized in these tubes. The general circulation takes place in countercurrent. Circulation of the alumina is obtained by differential fluidization arising out of the fact that the density of the fluid is higher in the downward circulation tubes than in the upward circulation tubes.

The apparatus can assume different forms, according to whether it operates by fluidization, i.e. with a vector gas such as air introduced into the apparatus, or by autofluidization, i.e. with a vector gas released into the tubes through the action of heat on the powder.

Figure 2:
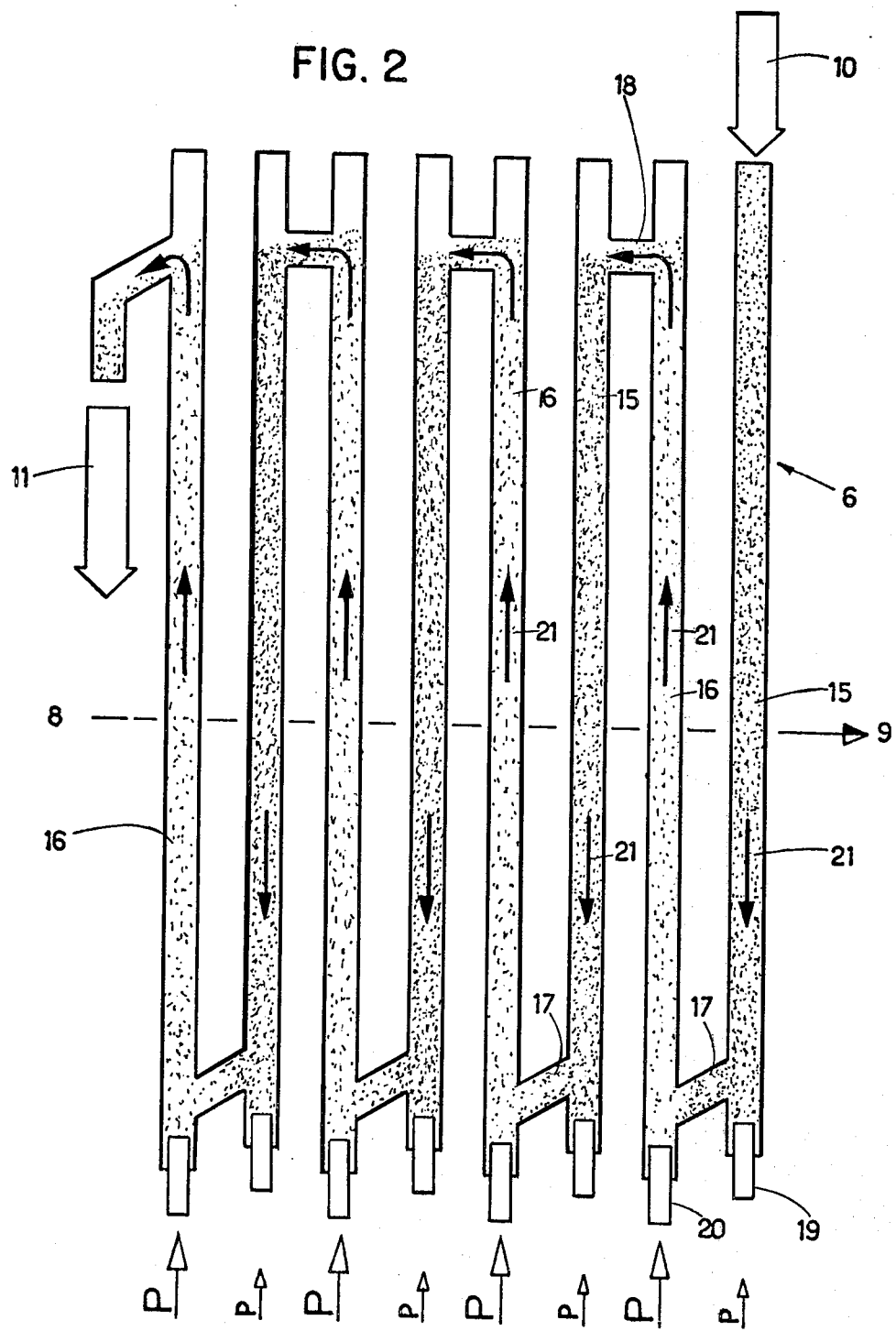
FIG. 2 is a section on a vertical plane through a tubular element for a heat exchanger.

FIG. 2 shows one embodiment of an apparatus using differential fluidization.

The exchanger comprises, mounted in the compartment 7 shown in FIG. 1, a plurality of exchange stages, each of which comprises a substantially vertical tube 15 in which the fluidized material circulates downwards (first series), and a substantially vertical tube 16 in which the material circulates upwards (second series). These tubes are connected by a pipe 17 at their lower ends. The tube 16 is connected to the tube 15 of the adjacent stage by a pipe 18 provided near its upper end. Each tube is provided at its lower end with a pipe 19 for 15, 20 for 16, for the injection of the vector gas used for fluidization. In the case of the descending fluid tubes 15, this vector gas is injected under a pressure $p$ lower than the pressure P under which it is injected into the ascending fluid tubes 16. The heat-carrying gas circulates horizontally in the arrowed direction 8–9 through the compartment 7. In this way, the flow of air through the descending tubes 15 is weaker than in the ascending tubes 16. The result is a fluid with a denser bed in the tube 15 than in the tube 16. This difference in mass produces a circulation of powder from the tubes 15 to the tubes 16, as indicated by the arrow 21. Each of the tubes 15 and 16 can be formed by several substantially vertical tubes arranged parallel to one another, i.e. connected together by pipes at their corresponding (upper or lower) ends.

The wet hydrated alumina enters the first descending tube 15 at 10 and leaves the apparatus at 11 towards the upper end of the last ascending tube 16.

Figure 3:
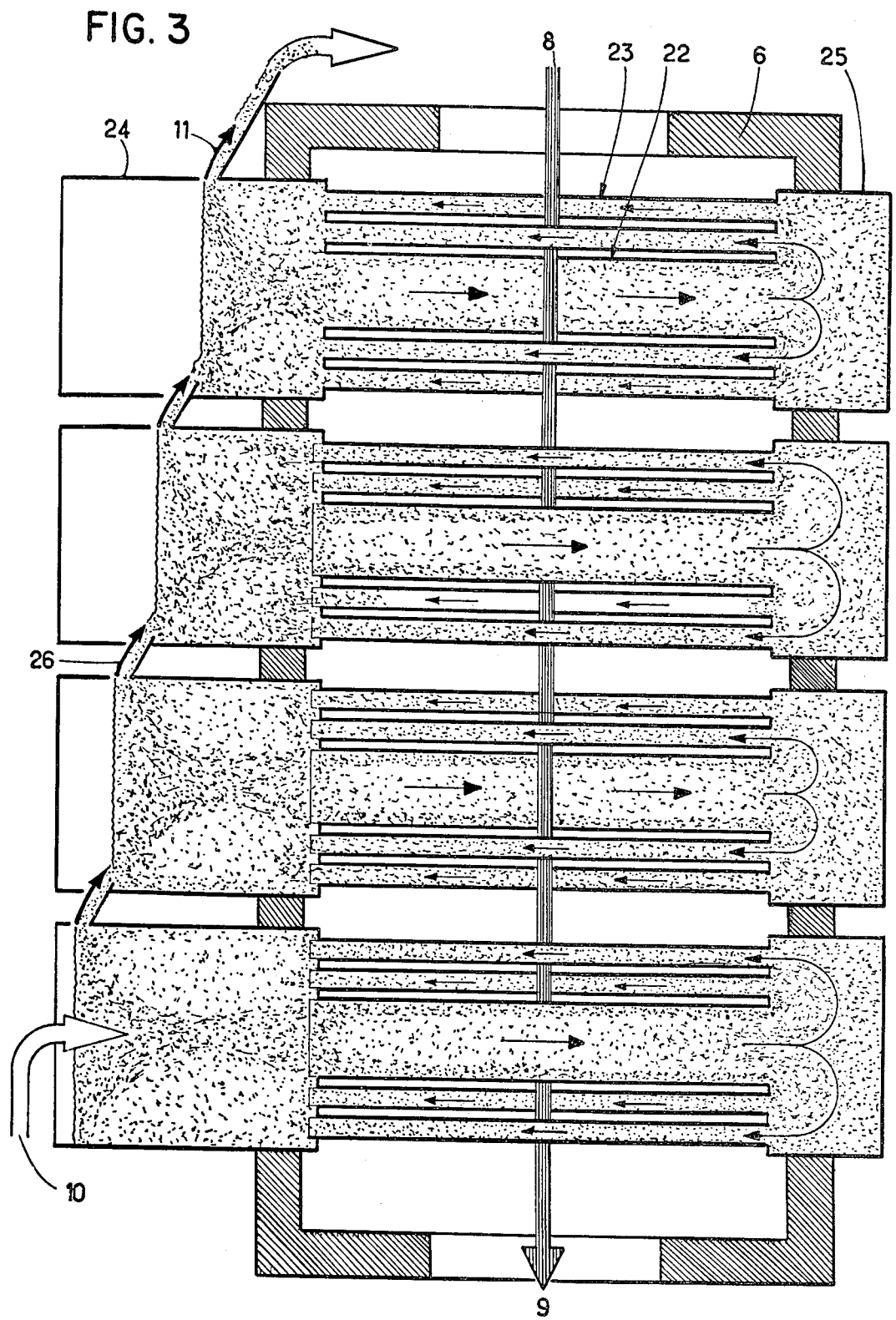
FIG. 3 shows another embodiment of a heat exchager.

FIG. 3 shows one example of an apparatus using differential autofluidization.

The exchanger comprises, again mounted in the compartment 7, at least one exchange stage and, in general, a plurality of exchange stages, each of which comprises at least one substantially vertical tube 22, in which the material circulates downwards, and several tubes 23, in which the material circulates upwards. The diameter of the tube 22 of the tube 22 is greater than that of the tubes 23. For each descending tube 22, there are several ascending tubes 23. The various tubes of one and the same stage are connected at their upper ends to an upper mixing chamber 24 and, at their lower ends, to a lower fluidization chamber 25. The various upper chambers are connected in series, i.e., each is connected to the two immediately adjacent chambers by a pipe 26, the chamber 24 of the first stage being additionally connected to the alumina inlet 10, whilst that of the last stage is connected to the alumina outlet 11. For a given throughput of alumina, the exchange surface is smaller in the descending tubes 22 of large diameter than in the ascending tubes of small diameter. Since autofluidization is based on the release of steam from the hydrated alumina heated by the heat-carrying gas, the throughput of steam through the descending tube of large diameter is lower than in the ascending tubes of smaller diameter. This difference is due to the larger cross-section of the descending tube and to the weaker flow of heat through this tube than through the ascending tubes due to the smaller exchanger surface of the large-diameter tube for a given throughput of alumina, and also to the fact that the heat-carrying gas/wall exchange coefficient is lower for a large diameter than for a small diameter.

The wet alumina hydrate is introduced directly at 10 into the upper chamber 24 for fluid mixture of the first stage where it is thoroughly admixed, due to the turbulence generated by the fluidized bed, with already dry alumina that has been heated to a temperature of from 130° to 160°C, which is the average temperature of this stage. The alumina issuing from the last stage of the exchanger at 11 still comprises about 11% of water of constitution at a temperature of the order of 300°C, which is the average temperature of the outlet stage.

This is because the alumina trihydrate has lost two molecules of water at around 300°C, the last molecule only disappearing at around 700°C, in the rotary kiln 1.

The principal resistance to the exchange of heat comes from the film of fumes. The arrangement in which the heat-carrying gas, i.e., the fumes emanating from the rotary kiln, circulate outside and perpendicularly of the tubes, is the most favorable. The exchange coefficients obtained are of the order 50 kcal/hour/m² for tubes 50 mm in diameter and a heat-carrying gas at 500°C for rates of gas flow of around 6 to 8 m/sec. The exchange surface required for the production of 100 tons per day of calcined alumina is thus of the order of 1500 square meters for progressing from hydrate containing 15% of moisture at 60°C to alumina containing 11% of water of constitution at 300°C. An exchanger of this kind, adapted to a conventional rotary kiln, enables from 15 to 20 kg of fuel to be saved per ton of calcined alumina without any appreciable increase in the consumption of electricity by comparison with the result obtained with an exchanger based on cyclones arranged in series.

Figure 4:
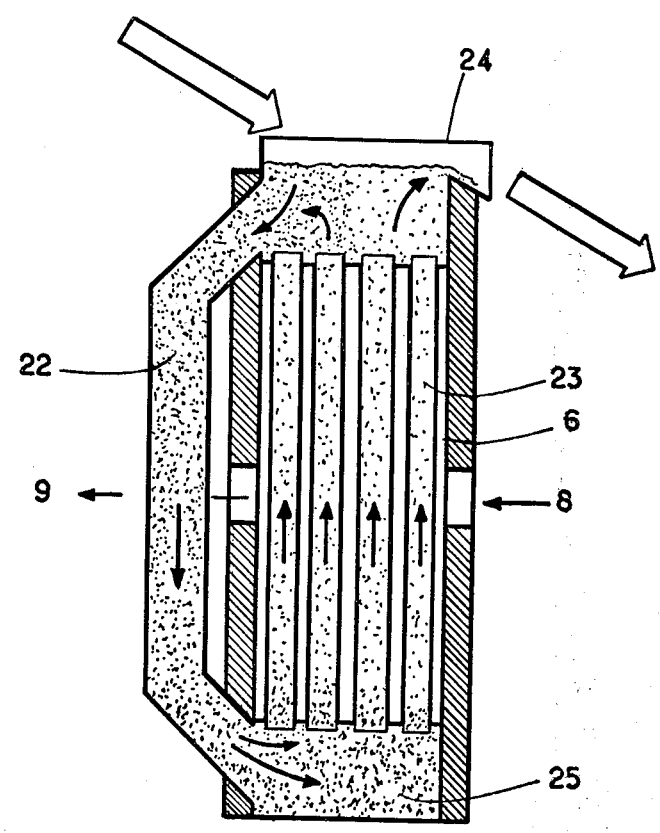
FIG. 4 shows a variant of this heat exchanger.

As illustrated in FIG. 4, which shows a single-stage exchanger, the descending tube 22 can be situated outside the compartment.

A test assembly according to FIG. 1, but comprising only a single stage, comprises a descending tube 22 with a diameter of 222 mm and a length of 5 meters, i.e. with a surface area of 3.5 m², and 16 ascending tubes 54 mm in diameter and 5 meters long, i.e. with a total surface area of 13.6 m². The exchange surface of the small tubes is four times greater than that of the large tube. The exchange coefficient K is, very approximately, inversely proportional to the square root of the diameter. Thus, K = 50 kcal/h/m²/°C for a 54 mm diameter tube,
K = 25 kcal/h/m²/°C for a 222 mm diameter tube.

The temperature difference between the large and the small tube reaches 5° to 20°C, depending upon the feed and recycling rate. Thus, the volution of steam is much more intense in the small tubes than in the large tubes, all the more so because, at certain temperatures, the dehydration reaction is extremely sensitive to this temperature. The corresponding descent rate in the large tube reaches from 1.5 to 3 meters per minute. The circulating charge is 4 to 8 times the charge delivered by the exchanger.

The invention is applicable to any heat exchanger between a gas and a fluidized powder and, more particularly, with installations for calcining hydrated alumina.

We claim:

1. In a process for heat exchange between a fluidized powder and a heat-carrying gas comprising providing one or more pairs of vertically disposed passages having an inlet in the upper end portion of one passage and an outlet in the upper end portion of the other passage with a passage connecting the lower end portions of the pair, introducing the powder through the inlet into one passage, and causing a fluidizing gas to flow upwardly through each of the passages in the pair with the flow rate of the fluidizing gas in the one passage being less than the flow rate of the fluidizing gas in the other passage whereby the fluidized powder in the one passage is higher in density than the powder in the other passage automatically to cause flow of the powder from the inlet downwardly in the one passage, across the communicating passage to the other passage and up the other passage to the outlet, and passing the heat-carrying gas in heat exchange relation with said pair of passages.

2. A process as claimed in claim 1, in which the heat input from the heat-carrying gas is greater in the second passage than in the first passage.

3. A process as claimed in claim 1 in which the fluidizing gas is introduced into each of the passages of the pair through their lower end portion with the fluidizing gas being introduced into the passages in an amount to provide a higher flow rate through the other passage than in the one passage.

4. A process as claimed in claim 1 in which the fluidizing gas is obtained, at least in part, by release of fluidizing gas from the effect of heat transferred from the heat-carrying gas to the powders by autofluidization wherein the amount of fluidizing gas released per cross-section in the one passage is less than that in the other passage to provide for the desired differential in flow rate of the fluidizing gases upwardly through the respective passages.

5. A process as claimed in claim 1 in which the heat-carrying gas is passed horizontally in indirect heat exchange with said passages.

6. A process as claimed in claim 1 which includes a plurality of pairs of passages with the outlet of said pairs of passages communicating in series with the inlet for passage of the fluidized powder from the other passage of one pair to the inlet of another pair.

7. A process as claimed in claim 1 for dehydrating or partially dehydrating wet hydrated alumina.

8. A heat exchanger for passing a fluidized particulate material in heat exchange relation with a heat-carrying gas comprising at least one heat exchange stage, each of which has a substantially vertically disposed tube having an inlet in the upper end portion, another substantially vertically disposed tube having an outlet in the upper end portion, and a passage communicating the lower end portions of the tubes, means for introducing particulate material into the inlet of the one tube, means for causing a fluidizing gas to flow upwardly through each of the tubes, and means for regulating the flow of fluidizing gas through the one tube at a rate which is less than the rate of flow of the fluidizing gas through the other tube whereby the density of particulate material in the other tube is less than in the one tube whereby the fluidized particulate material flows downwardly through the one tube and across the communicating passage for flow upwardly through the other tube, and means for passing a heat-carrying gas across the tubes during passage of the particulate material therethrough.

9. A heat exchanger as claimed in claim 9 which includes a compartment having opposite lateral walls between which the tubes are located, an inlet in one wall and an outlet in the other through which the heat-carrying gas flows into and out of the compartment.

10. A heat exchanger as claimed in claim 9, wherein the tubes in which the fluidized powder circulates downwards are arranged in the compartment.

11. A heat exchanger as claimed in claim 9, wherein the tubes in which the fluidized powder circulates downwards are situated outside the compartment and do not come into contact with the heat-carrying gas.

12. A heat exchanger as claimed in claim 8 which includes an upper mixing chamber and in which the inlet and outlet of the tubes communicate with the upper mixing chamber.

13. A heat exchanger as claimed in claim 12 which includes a plurality of such heat exchange stages, with the tubes of each stage connected at their upper ends to the upper mixing chamber, pipes connecting the upper mixing chambers in series, and means for feeding the particulate material to the first stage and means for removing particulate material from the last stage.

14. A heat exchanger as claimed in claim 8 which includes a lower fluidizing chamber underlying the lower end portions of the tube with the lower ends of the tubes communicating with the lower fluidizing chamber.

15. A heat exchanger as claimed in claim 8 in which the diameter of the tubes through which the particulate material circulates in the downward direction is greater than that of the tubes through which the particulate material circulates in the upward direction.

16. A heat exchanger as claimed in claim 15 in which the heat transfer coefficient is lower for the tubes of larger diameter than for the tubes of smaller diameter thereby to produce a differential autofluidization effect which causes the autofluidized particulate material to circulate from the tubes of larger diameter towards the tubes of smaller diameter.

17. A heat exchanger as claimed in claim 8 in which the tube through which the particulate material circulates in the downward direction comprises a single tube while the tube through which the particulate material circulates in the upward direction comprises a plurality of tubes.

18. The use of the heat exchanger claimed in claim 8 for drying and partly dehydrating wet hydrated alumina.

* * * * *